James H. Lindsay's Improvement in Journal Bearings.

No. 122,898.                  Patented Jan. 23, 1872.

Witnesses.
A. C. Johnston
Jas. G. Thompson

Inventor.
James H. Lindsay
By his attorney
A. C. Johnston

122,898

UNITED STATES PATENT OFFICE.

JAMES H. LINDSAY, OF ALLEGHENY, PENNSYLVANIA.

IMPROVEMENT IN JOURNAL-BEARINGS.

Specification forming part of Letters Patent No. 122,898, dated January 23, 1872; antedated January 19, 1872.

*To all whom it may concern:*

Be it known that I, JAMES H. LINDSAY, of the city and county of Allegheny, State of Pennsylvania, have invented a new and useful Improvement in Journal-Bearings; and I do hereby declare that the following is a full, clear, and exact description thereof, reference being had to the accompanying drawing and to the letters of reference marked thereon.

The nature of my invention consists in so constructing bearings for journals of shafts, rolls, and the axes of other revolving machinery that said bearings shall be provided with one or more apertures for the double purpose of holding "waste" or other material for absorbing oil or other lubricating matter and for lubricating the journal or axis revolving in said bearings.

To enable others skilled in the art to make and use my invention, I will proceed to describe more fully its construction and operation.

Figure 1:
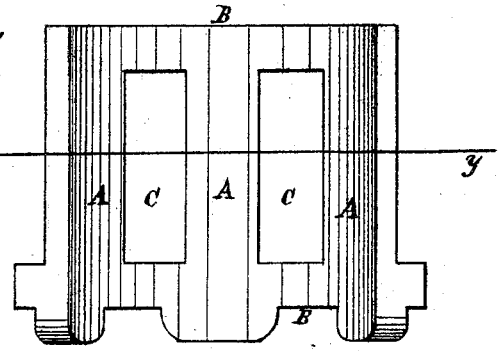
Figure 2:
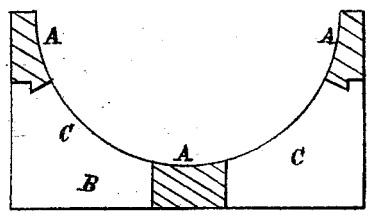
Figure 3:
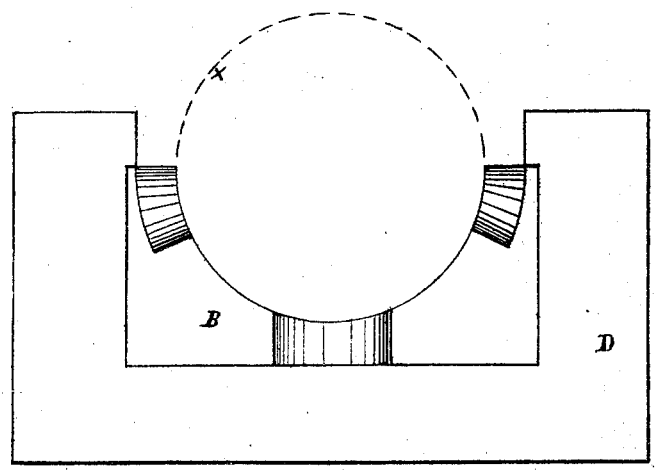

In the accompanying drawing which forms part of my specification, Figure 1 is a top view or plan of my improvement in bearings for journals. Fig. 2 is a transverse section of the same when cut through at line *y* of Fig. 1. Fig. 3 is an end view of the same when placed in a housen for rolls or other machinery.

In the accompanying drawing, A A A and B B represent the bearing-surfaces of the bearing for the journal or axis which may be placed in it. C C represents the apertures in the bearings. D represents the housen or other parts of a machine in which the bearing may be placed.

It will be observed, by reference to the accompanying drawing, that my improved bearing is a skeleton of an ordinary bearing for journals, and differs from the ordinary bearing only in having the apertures C C.

The bearing may be constructed in any of the known forms and of any suitable material, but in every case must be provided with the apertures C C, for they form one of the main features of my invention. Having the bearings constructed substantially as hereinbefore described, they are placed in the proper place in the housen, as shown in Fig. 3, or other place in a machine. The apertures C C are then filled with cotton "waste" or other material which will absorb oil or other lubricating matter, which is then poured in on the "waste." The journals or axis for which the bearings are intended are then placed in position, as indicated by the dotted lines X.

The advantage of bearings constructed as hereinbefore described consists in saving material in their construction, avoiding the heating of the journal or axis revolving in them, saving of oil or other lubricating matter, and in a more perfect lubrifaction of the journals or axis of shafts, rolls, or other revolving parts of machinery.

Having thus described the nature, construction, and operation of my invention, what I claim is—

A skeleton journal-bearing that is formed with two or more openings, C, extending through it so that the absorbing material placed in said openings will rest directly on the support or rest of the journal, as herein described.

JAMES H. LINDSAY.

Witnesses:
 A. C. JOHNSTON,
 JAMES G. THOMPSON.